United States Patent
Hajiaghajani (10) Patent No.: US 7,892,304 B2
(45) Date of Patent: Feb. 22, 2011

(54) APPARATUS AND METHOD FOR CONTROLLING COMPRESSOR MOTOR SPEED IN A HYDROGEN GENERATOR

(75) Inventor: Masoud Hajiaghajani, Houston, TX (US)

(73) Assignee: Texaco Inc., San Ramon, CA (US)

( * ) Notice: Subject to any disclaimer, the term of this patent is extended or adjusted under 35 U.S.C. 154(b) by 738 days.

(21) Appl. No.: 11/015,359

(22) Filed: Dec. 17, 2004

(65) Prior Publication Data

US 2008/0005964 A1 Jan. 10, 2008

(51) Int. Cl.
*C10J 3/46* (2006.01)
*H02P 9/00* (2006.01)

(52) U.S. Cl. .......................... 48/197 R; 322/44; 322/47; 322/54

(58) Field of Classification Search ............... 48/197 R, 48/61, 127.9; 322/44, 47, 54
See application file for complete search history.

(56) References Cited

U.S. PATENT DOCUMENTS

| | | | | |
|---|---|---|---|---|
| 2,041,833 | A | * | 5/1936 | Hitchcock ................. 236/9 R |
| 3,236,221 | A | * | 2/1966 | Lear ...................... 123/179.28 |
| 3,561,557 | A | * | 2/1971 | Magnuson et al. ......... 180/65.2 |
| 3,724,435 | A | * | 4/1973 | Bier ............................ 123/482 |
| 3,913,547 | A | * | 10/1975 | Wentworth et al. .......... 123/482 |
| 4,024,912 | A | * | 5/1977 | Hamrick et al. ............... 166/57 |
| 4,193,111 | A | * | 3/1980 | Wester .......................... 363/84 |
| 4,238,204 | A | | 12/1980 | Perry |
| 4,406,950 | A | * | 9/1983 | Roesel, Jr. .................. 290/4 C |
| 4,598,836 | A | | 7/1986 | Wessel |
| 4,690,695 | A | | 9/1987 | Doshi |
| 4,925,464 | A | | 5/1990 | Rabenau et al. |
| 4,971,522 | A | | 11/1990 | Butlin |

(Continued)

FOREIGN PATENT DOCUMENTS

JP 2000 272901 10/2000

(Continued)

OTHER PUBLICATIONS

Machine translation for JP-2000-272901A—Feb. 10, 2010.*

(Continued)

*Primary Examiner*—Walter D Griffin
*Assistant Examiner*—Huy-Tram Nguyen
(74) *Attorney, Agent, or Firm*—Melissa Patangia; Frank C. Turner (57) ABSTRACT

An apparatus for producing hydrogen having compressor motor speed control. The apparatus includes a hydrogen generator for producing a product comprising hydrogen and a compression unit for compressing the product. The hydrogen generator can include a fuel processor having an oxidizer and a reformer. The compression unit has an induction motor and means for regulating the speed of the motor. The means for regulating the speed of the motor can include a variable frequency drive or soft start device having a plurality of switches and an adjustable ramp timer. A downstream unit including one or more of a purification unit, a second compression unit, and a storage unit is disposed downstream of the compression unit. A method for producing hydrogen is provided that includes generating a product comprising hydrogen in a hydrogen generator, compressing the product in a compression unit having an induction motor and regulating the speed of the motor in response to transient operations of the hydrogen generator.

9 Claims, 3 Drawing Sheets

U.S. PATENT DOCUMENTS

| | | | |
|---|---|---|---|
| 5,256,174 A | 10/1993 | Kai et al. | |
| 5,435,836 A | 7/1995 | Anand et al. | |
| 5,495,160 A * | 2/1996 | Pond | 318/801 |
| 5,593,478 A | 1/1997 | Hill et al. | |
| 5,631,545 A * | 5/1997 | Norman et al. | 323/205 |
| 5,668,457 A | 9/1997 | Motamed | |
| 5,669,960 A | 9/1997 | Couche | |
| 5,753,010 A | 5/1998 | Sircar et al. | |
| 5,807,423 A | 9/1998 | Lemcoff et al. | |
| 5,808,441 A * | 9/1998 | Nehring | 318/751 |
| 6,056,804 A | 5/2000 | Keefer et al. | |
| 6,063,161 A | 5/2000 | Keefer et al. | |
| 6,066,898 A * | 5/2000 | Jensen | 290/52 |
| 6,154,605 A | 11/2000 | Aonuma | |
| 6,163,137 A * | 12/2000 | Wallace et al. | 322/20 |
| 6,279,532 B1 * | 8/2001 | Takano et al. | 123/357 |
| 6,372,026 B1 | 4/2002 | Takemasa et al. | |
| 6,406,523 B1 | 6/2002 | Connor et al. | |
| 6,432,176 B1 | 8/2002 | Klos et al. | |
| 6,436,562 B1 * | 8/2002 | DuBose | 429/13 |
| 6,451,095 B1 | 9/2002 | Keefer et al. | |
| 6,471,744 B1 | 10/2002 | Hill | |
| 6,488,747 B1 | 12/2002 | Keefer et al. | |
| 6,595,757 B2 | 7/2003 | Shen | |
| 6,616,415 B1 * | 9/2003 | Renken et al. | 417/44.1 |
| 6,619,336 B2 | 9/2003 | Cohen et al. | |
| 6,645,653 B2 * | 11/2003 | Kashiwagi | 429/22 |
| 6,712,087 B2 | 3/2004 | Hill et al. | |
| 6,770,391 B2 | 8/2004 | Nelson et al. | |
| 7,028,671 B2 * | 4/2006 | Mc Clure et al. | 123/514 |
| 2002/0094310 A1 | 7/2002 | Krause et al. | |
| 2003/0175564 A1 | 9/2003 | Mitlitsky et al. | |
| 2003/0182944 A1 * | 10/2003 | Hoffman et al. | 60/772 |
| 2003/0204993 A1 * | 11/2003 | Holland et al. | 48/127.9 |
| 2003/0227276 A1 * | 12/2003 | Agbossou et al. | 320/112 |
| 2004/0018145 A1 * | 1/2004 | Suzuki et al. | 423/657 |
| 2004/0049982 A1 * | 3/2004 | Shimizu et al. | 48/61 |
| 2004/0166746 A1 * | 8/2004 | Krietzman | 440/6 |
| 2004/0197216 A1 * | 10/2004 | Kuroda | 417/470 |
| 2006/0289080 A1 * | 12/2006 | Chan et al. | 141/94 |
| 2007/0251236 A1 * | 11/2007 | Barthelet et al. | 60/608 |

FOREIGN PATENT DOCUMENTS

JP     2004 116544     4/2004

OTHER PUBLICATIONS

Zenginobuz, G., et al.; Soft Starting of Large Induction Motors at Constant Current with Minimised Starting Torque Pulsations, Industry Applications Conference, 2000, vol. 3, pp. 1593-1604.

Blaabjerg, F., et al.; Can Soft-Starters Help Save Energy?, IEEE Industry Applications Magazine, Sep./Oct. 1997, vol. 3, No. 5, pp. 56-66.

* cited by examiner

APPARATUS AND METHOD FOR CONTROLLING COMPRESSOR MOTOR SPEED IN A HYDROGEN GENERATOR

FIELD OF THE INVENTION

The present invention relates generally to the field of hydrogen generation. The apparatus and methods of the present invention produce a hydrogen-enriched product by removing impurities from a product comprising hydrogen and one or more impurities. Impurities can be removed through various purification technologies such as pressure swing adsorption, membrane separation and the like that require the product to be at a relatively high pressure feed. The compression of a purified or hydrogen-rich product for storage purposes is also addressed. More specifically, the present invention relates to the integration and operation of a pressure swing adsorbent unit with a fuel processing unit to produce a hydrogen-enriched reformate.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluent gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of an infrastructure that can provide generation, storage and widespread distribution of hydrogen.

One way to overcome this difficulty is through distributed generation of hydrogen, such as through the use of fuel processors to convert hydrocarbon-based fuels to hydrogen-rich reformate. Fuel reforming processes, such as steam reforming, partial oxidation, and autothermal reforming, can be used to convert hydrocarbon-based fuels such as natural gas, LPG, gasoline, and diesel, into hydrogen-rich reformate at the site where the hydrogen is needed. However, in addition to the desired hydrogen product, fuel reformers typically produce undesirable impurities that reduce the value of the reformate product. For instance, in a conventional steam reforming process, a hydrocarbon feed, such as methane, natural gas, propane, gasoline, naphtha, or diesel, is vaporized, mixed with steam, and passed over a steam reforming catalyst. The majority of the hydrocarbon feed is converted to a reformate mixture of hydrogen and impurities such as carbon monoxide and carbon dioxide. To reduce the carbon monoxide content, the reformate is typically subjected to a water-gas shift reaction wherein the carbon monoxide is reacted with steam to form carbon dioxide and hydrogen. After the shift reaction(s), additional purification steps may be utilized to bring the hydrogen purity to acceptable levels. These purification steps can include, but are not limited to, methanation, selective oxidation reactions, membrane separation techniques, and selective adsorption such as temperature swing adsorption and/or pressure swing adsorption processes.

Although purification technologies can effectively provide a purified hydrogen product, many require compression of the product to an initial high pressure feed. Similarly, many forms of hydrogen storage such as the use of hydrogen-fixing materials and high pressure tanks require a high pressure hydrogen feed as well. However, the feed derived from a hydrogen generator such as a fuel processor, can have fluctuations in pressure and/or flow rate, particularly during start-up, shut down, and other transients. Failure to properly control the speed of a compression unit that is used to compress such a feed, particularly during transient operations of the hydrogen generator, can create a vacuum within the system. Moreover, even when the flow rate of the product from the hydrogen generator is relatively stable, such a vacuum can occur when an associated compressor is energized and/or de-energized. The occurrence of a vacuum imposes stresses on the system components, can cause upsets within the hydrogen generator, and creates the potential for atmospheric gases to be drawn into the system.

SUMMARY OF THE INVENTION

In one aspect of the present invention, an apparatus for producing hydrogen is provided. The apparatus includes a hydrogen generator for producing a product comprising hydrogen and a compression unit downstream of the hydrogen generator for receiving the product and producing a compressed product. The hydrogen generator can include a fuel processor having an oxidizer and a reformer. The compression unit has an induction motor and means for regulating the speed of the motor. The means for regulating the speed of the motor can include a variable frequency drive or soft start device. Where the means for regulating the speed of the motor includes a soft start device, the soft start device can have a plurality of switches that have an adjustable firing angle, and an adjustable ramp timer. A downstream unit is disposed downstream of the compression unit. The downstream unit includes one or more of a purification unit for receiving at least a portion of the compressed product and producing a hydrogen-enriched product, a second compression unit for receiving and compressing a compressed product or a hydrogen-enriched product, and a storage unit for receiving and storing a compressed product, a hydrogen-enriched product or a compressed hydrogen-enriched product.

In a process aspect of the present invention, a method for producing hydrogen is provided. The method includes the steps of generating a product comprising hydrogen in a hydrogen generator, compressing the product in a compression unit having an induction motor to produce a compressed product, and regulating the speed of the motor in response to transient operations of the hydrogen generator. The hydrogen generator can include a fuel processor. The speed of the motor can be regulated by adjusting the line frequency of the voltage applied to the induction motor or by adjusting the RMS of the voltage applied to the induction motor.

BRIEF DESCRIPTION OF THE DRAWINGS

The invention may be understood by reference to the following description taken in conjunction with the accompanying drawings.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

An apparatus of the present invention includes a hydrogen generator for producing a product comprising hydrogen. The invention relates to reducing or dampening fluctuations in pressure that can occur at the inlet of a compression unit associated with the hydrogen generator, particularly during start-up, shut-down and other transient operations. The compression unit is disposed downstream of the hydrogen generator and has an induction motor and means for regulating the speed of the motor. A downstream unit is disposed downstream of the compression unit that includes one or more of a purification unit for receiving at least a portion of the compressed product and producing a hydrogen-enriched product, a second compression unit for receiving and compressing a compressed product or a hydrogen-enriched product, and a storage unit for receiving and storing a compressed product, a hydrogen-enriched product or a compressed hydrogen-enriched product.

An apparatus of the present invention includes a hydrogen generator capable of producing a product comprising hydrogen and one or more impurities as described herein. Suitable hydrogen generators are well known in the art and can include any device or apparatus that is capable of generating a gas that is rich in free hydrogen from a materials that are rich in bonded hydrogen. Such devices can include gasifiers, fuel processors, electrolyzers and the like. In a preferred embodiment, the hydrogen generator includes a fuel processor capable of producing a product comprising hydrogen and one or more impurities. The ultimate objective of an apparatus of the present invention is to produce a substantially pure hydrogen product that can be used safely and reliably in any hydrogen-consuming device or process. As such, an "impurity" in this context includes any material that has the potential to foul, damage or otherwise interfere with the operation of hydrogen-consuming device or process or a hydrogen-storage device. Such impurities typically include sulfur-containing compounds, nitrogen-containing compounds, carbon oxides, liquid water, steam, unreacted hydrocarbons, and inert gases. Depending on the type of fuel processor variations or fluctuations in the pressure, flow-rate and/or composition of the product can occur during steady state operations but particularly during transients.

Figure 4:
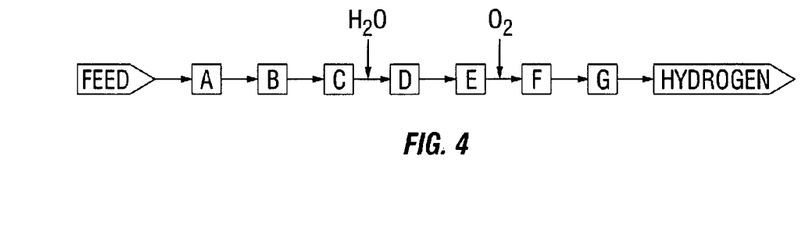
FIG. 4 is a block diagram illustrating a process flow within a fuel processor.

In some embodiments, the fuel processor comprises an oxidizer and reformer for converting a fuel to a product that comprises hydrogen and one or more impurities. Reformers are well known in the fuel processing art and can be designed to perform one or more of steam reforming, partial oxidation, and autothermal reforming among others. Although fuel processors suitable for use as the fuel processor can utilize any known reformer, the following description associated with FIG. 4 is adapted from U.S. patent application Ser. No. 10/006,963, entitled "Compact Fuel Processor for Producing a Hydrogen Rich Gas," filed Dec. 5, 2001, in the name of Krause, et al., and published Jul. 18, 2002, (Publication No. US2002/0094310 A1), which describes a fuel processor for performing a combination of steam reforming and autothermal reforming.

As illustrated in FIG. 4, the feed to the fuel processor can include a hydrocarbon-based fuel, oxygen, water, and mixtures of the same. Hydrocarbon-based fuels suitable for use in the processor can include natural gas, LPG, gasoline, diesel, alcohols, and mixtures thereof. Natural gas is a preferred hydrocarbon-based fuel. Oxygen can be in the form of air, oxygen-enriched air, or substantially pure oxygen. Fuel(s) and water can be introduced as liquid and/or vapor. However, depending on the initial phase of the feed materials and the nature of the reforming reaction(s) some degree of feed preparation may be required. For instance, it is preferred that both liquid water and fuel(s) be converted to a gas phase, and further that reactants be pre-heated prior to their introduction into a reaction zone within the reformer.

Block A of FIG. 4 represents a reforming step, in which, in one particular embodiment, two reactions, a partial oxidation (formula I, below) and a steam reforming (formula II, below), are performed to convert the feed into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

A higher concentration of oxygen in the feed stream favors the exothermic partial oxidation whereas a higher concentration of water vapor favors the endothermic steam reforming reaction. Therefore, the ratios of oxygen to hydrocarbon and water to hydrocarbon as well as the reaction temperature are characterizing parameters that affect hydrogen yield. The reaction temperature of reforming step A can range from about 550° C. to about 900° C., depending on the feed conditions and the catalyst. Examples of partial oxidation and steam reforming catalysts are well known in the fuel reforming art and are not described in detail.

Block B represents a cooling step wherein the synthesis gas stream from reforming step A is cooled to a temperature of from about 200° C. to about 600° C., and preferably from about 375° C. to about 425° C., to prepare the synthesis gas for process step C (discussed below). This cooling may be achieved with heat sinks, heat pipes, heat exchangers or the like depending upon the design specifications and the extent to which heat is to be recovered/recycled from the synthesis gas. Cooling of the synthesis gas can also be achieved by other means known in the art, e.g., injection of a lower temperature steam into the synthesis gas stream.

Block C represents a desulphurization step. One of the main impurities of many fuels is sulfur, which is commonly converted to hydrogen sulfide during reforming step A. Desulfurization preferably utilizes zinc oxide and/or other material(s) capable of absorbing and converting the hydrogen sulfide, with or without a support (e.g., monolith, extrudate, pellet, etc.). Desulphurization can be accomplished by converting the hydrogen sulfide to zinc sulfide in accordance with the following reaction formula III:

$$H_2S + ZnO \rightarrow H_2O + ZnS \quad (III)$$

Desulfurization is preferably carried out at a temperature of from about 300° C. to about 500° C., and more preferably from about 375° C. to about 425° C.

The desulfurized process stream may then be sent to a mixing step D wherein water received from a water subsystem is optionally added. The addition of water serves the dual purposes of lowering the temperature of the process stream and of supplying additional water for use in the water gas shift reaction to follow. The water vapor and other stream components are mixed by being passed through a stage of inert materials such as ceramic beads or other similar materials that effectively mix and/or assist in the vaporization of water. Alternatively, additional water can be introduced prior to reforming step A and the mixing step can be repositioned or eliminated. Where the process stream is to be subjected to a selective oxidation, a mixing step may also be utilized to mix an oxidant with the process stream prior to oxidation.

Block E represents a water gas shift reaction step that converts carbon monoxide to carbon dioxide in accordance with formula IV:

$$H_2O + CO \rightarrow H_2 + CO_2 \quad (IV)$$

Generally, the water gas shift reaction can take place at temperatures ranging from 150° C. to 600° C. depending on the catalyst. Under such conditions, much of the carbon monoxide in the gas stream is converted to carbon dioxide. Where the hydrogen-enriched product is to be used as a fuel for fuel cells, the concentration of carbon monoxide needs to be lowered to a level that can be tolerated by fuel cell catalyst(s), typically below about 50 ppm. Examples of water gas shift catalysts, both low and high temperature catalysts, are well known in the fuel reforming art and are not set forth in detail herein.

Block F represents a cooling step that can be performed in an inert stage or otherwise to reduce the temperature of the process stream to a temperature preferably in the range of from about 90° C. to about 150° C. When the cooling step F is to be followed by a selective or preferential oxidation step, oxygen from an air subsystem can also be added to the process stream.

Block G represents an optional selective or preferential oxidation step wherein much of the remaining carbon monoxide in the process stream is converted to carbon dioxide. Although this oxidation is carried out in the presence of a catalyst having activity for oxidizing carbon monoxide, two reactions typically occur, namely, a desirable oxidation of carbon monoxide (formula V) and an undesirable oxidation of hydrogen (formula VI).

$$CO + \tfrac{1}{2}O_2 \rightarrow CO_2 \quad (V)$$

$$H_2 + \tfrac{1}{2}O_2 \rightarrow H_2O \quad (VI)$$

Since both reactions produce heat and because the preferred oxidation of carbon monoxide is favored by low temperatures, it may be advantageous to optionally include a cooling element such as a cooling coil within an oxidation reaction zone. The oxidation reaction temperature is preferably kept in the range of from about 90° C. to about 150° C. Because an apparatus of the present invention can optionally comprise a purification unit such as a pressure swing adsorption unit for separating hydrogen from impurities, the use of selective oxidation step G may be omitted.

The product produced by a fuel processor such as that described in reference to FIG. 4 is rich in hydrogen but can contain one or more impurities such as carbon monoxide, carbon dioxide, water, steam, inert components such as nitrogen and argon, various sulfur and nitrogen-containing compounds as well as unreacted hydrocarbons. Thus, it may be desirable to subject the product to purification or clean-up processes to remove or reduce such impurities. Further, the product is typically at a low pressure, on the order of less than about 50 psig, preferably less than about 25 psig, more preferably less than about 10 psig and still more preferably less than about 5 psig. Depending on the nature of the purification technique to be used, the pressure of the product may need to be increased prior to delivery to the purification unit. Therefore, an apparatus of the present invention includes a compression unit downstream of the fuel processor for receiving the product and producing a compressed product for delivery to the purification unit. In some embodiments, such as where the hydrogen-enriched product exiting the purification unit is destined for a storage unit such as in a high pressure tank, a second compression unit can optionally be disposed intermediate the purification unit and the storage unit for increasing the pressure of the hydrogen-enriched product.

Compression units are known in the art for compressing mixtures of gases containing hydrogen prior to subjecting the mixtures to separation techniques and/or storage. A more detailed description of such compression technologies can be found in chemical engineering references such as Perry's Chemical Engineers' Handbook, 4$^{th}$ Ed. (McGraw-Hill, © (1963), and in the patent literature such as in U.S. Pat. No. 4,690,695 issued Sep. 1, 1987 to Doshi; U.S. Pat. No. 6,488,747 issued Dec. 3, 2002 to Keefer et al.; and U.S. Application Publication No. US 2003/0175564 A1 published Sep. 18, 2003 by Mitlitsky et al.; the descriptions of which are incorporated by reference. While the compression unit need not be described in exacting detail, it should be recognized that a suitable compression unit can comprise a compressor driven by a fixed or variable speed motor in a single stage or two or more compressors in a multi-stage compression unit. Further, suitable compression units can include axial, centrifugal, reciprocating, rotary-type compressors and combinations of the same. In a preferred embodiment, the compression unit comprises an induction motor having a power rating of less than about 25 hp, preferably less than about 20 hp and more preferably less than about 15 hp. Where the compression unit comprises a compressor motor operated at a selected speed, the purification unit preferably controls the flow of product to the plurality of adsorbent beds independent of the selected speed of the compressor motor.

The pressures that the compression unit should be capable of imposing on a fluid will depend on the pressure requirements of the unit for which compression is needed. In the case of a purification unit comprising a pressure swing adsorption unit, the pressure required of the flow of product to the PSA can vary between about 1 psig and about 600 psig. Where compression is needed to facilitate storage of the hydrogen-enriched product, the required pressure of the hydrogen-enriched product can vary from just above zero to more than 10,000 psig. One skilled in the art will appreciate that the selection of a suitable compression unit will be based on such factors as the composition of the product, its flow rate, pressure and temperature, the pressure requirements of the downstream unit(s), as well as factors such as the compression unit's power consumption, serviceability, cost and overall efficiency.

In an embodiment wherein the purification unit comprises a pressure swing adsorption unit ("PSA"), the flow of product to a plurality of adsorbent beds within the PSA and the adsorption period during which impurities are adsorbed from the flow of product through the adsorbent beds are controlled in a manner that is independent of the speed or output of the compressor(s). More specifically, where the purification unit comprises a rotary-type PSA having a rotary distribution valve for controlling the material flows to the adsorbent beds, the rotary distribution valve is preferably operated independently of the speed or output of the compression unit. In such embodiments, the compression unit can comprise fixed speed compressors.

In embodiments where the compression unit comprises an induction motor, the compression unit will also include means for regulating the speed of the motor. The speed of the compressor motor is regulated in response to transients that occur in the operation of the hydrogen generator. Regulation or adjustment of the speed of the motor includes ramping the speed up or down by adjusting the power applied to the motor. For instance, during start up of the hydrogen generator, power to the compressor motor can be ramped up from zero to full power, preferably at a selected rate for a selected ramp-up time period. Similarly during shut-down, the power applied to the motor will be ramped down at a selected rate for a selected ramp-down time period. It is also envisioned that some intermediate adjustments of the power applied to the compressor motor can occur when the speed of the compressor is to be sustained at an intermediate speed, such as when the hydrogen generator has been turned down. By using such means, the speed of the compressor motor can be coordinated with the flow of product to the compression unit and prevent the creation of a vacuum at the inlet of the compressor.

Means for regulating the speed of the motor can include a variable frequency drive ("VFD") for adjusting the line frequency of the voltage applied to the motor. Because the speed of the induction motor is proportional to the frequency of the applied voltage, adjustment of the line frequency by the VFD enables an operator or controller to regulate and adjust the speed of the induction motor. In an alternative, the means for regulating the speed of the motor can include a soft start device for adjusting the root mean square ("RMS") of the voltage delivered to the motor during start-up and/or shut-down. Soft start devices suitable for adjusting the RMS of the voltage delivered to the induction motor can include a plurality of switches having an adjustable firing angle and an adjustable ramp timer. The switches can comprise solid state AC switches such as triacs, diodes, and SCRs. The soft starter preferably comprises three pairs of SCR switches connected in reverse parallel. The firing angle of the switches can be adjusted over a range from 0° to about 120°, but is preferably adjusted to an angle between 0° and about 75°. The firing angle selected will correspond to the starting voltage of the soft starter and can be selected based upon the minimum torque required to initiate rotation within the motor. The ramp timer can be adjusted so that the ramp period has any time period desired. For a flow of product generated by a fuel processor as described herein the ramp timer can have a time period of less than about 1 minute, preferably less than about 30 seconds, more preferably less than about 20 seconds, and still more preferably less than about 10 seconds. The soft start device can have a local controller or processor for controlling its operation and adjusting the RMS of the line voltage to be applied to the motor. Suitable soft start devices are well known and commercially available from manufacturers such Schneider Electric SA of Paris, France. The soft start device utilized in the development of the present invention was a SquareD™ Model No. ATS01N232LU.

As noted herein, the flow of product from the hydrogen generator can also exhibit fluctuations in pressure and/or flow rate during steady state operations. Thus, an apparatus of the present invention can optionally include means for reducing or eliminating such fluctuations before they reach the downstream unit. As used herein, "reducing fluctuations in pressure and/or flow rate" is intended to refer to reductions in either the size or number of fluctuations in the pressure and/or flow rate of the product that is destined for the downstream unit. Moreover, such means can also be employed to prevent the formation of a vacuum at the inlet of the compression unit within the line(s) carrying product to the compression unit.

The means for reducing such fluctuations can comprise a buffer disposed intermediate the hydrogen generator and the downstream unit. Although such a buffer could be disposed at any location intermediate the hydrogen generator and the downstream unit, it is preferably disposed upstream of a compression unit so that a more uniform flow of product is provided to an inlet of the compression unit. Those skilled in the art will appreciate that such a buffer will have sufficient volume to receive a variable flow of product from the hydrogen generator while releasing a more uniform flow for delivery to the downstream unit. Moreover, in an embodiment where the buffer is disposed upstream from the compression unit, the flow of product from the buffer should be sufficient to prevent a vacuum from forming at the compression unit inlet either during start-up, shut-down or steady state operations.

Means for reducing fluctuations in the pressure and/or flow rate can also comprise a conduit for providing a controlled flow of a supplemental fluid to an inlet of the compression unit. The supplemental fluid can include a compressed flow of product derived from an outlet of the compression unit, a hydrogen-enriched product derived from a purification unit, or some mixture thereof. The conduit has an outlet that directs the supplemental fluid into a line carrying product from the hydrogen generator to the compression unit.

The number and location of conduit inlets are determined by the composition of the supplemental fluid. Where the supplemental fluid includes a compressed product, the conduit has an inlet downstream of the compression unit. Where the supplemental fluid includes a hydrogen-enriched product, the conduit has an inlet downstream from a purification unit. In such an embodiment, the purification unit can optionally include a first outlet for directing a hydrogen-enriched product and a second outlet for directing a hydrogen-depleted product out of the purification unit with the inlet of the conduit in fluid communication with the first outlet of the purification unit. In addition, the conduit can have two or more inlets depending on the composition of the supplemental fluid. Specifically, where the apparatus has a purification unit disposed downstream of the compression unit, the conduit can have an inlet intermediate the compression and purification units for directing compressed product into the conduit, and a second inlet downstream of the purification unit for directing a hydrogen-enriched product into the conduit.

In some embodiments, the conduit can have a variable-opening valve for controlling the flow of supplemental fluid therethrough. Where the apparatus includes an optional sensor for sensing the fluid flowing from the hydrogen generator to the compression unit, the variable-opening valve can be operated in response to sensed data generated by the sensor. More specifically, a sensor can be disposed upstream from but proximate to an inlet of a compression unit for acquiring data about the fluid(s) entering the compression unit. Preferably, the sensor will comprise a sensor for sensing the pressure and/or flow rate of the product at the inlet of the compression unit. In some embodiments, the sensor will be in communication with a controller so that sensed data can be relayed to the controller for operating the valve in response to the sensed data. By way of illustration, when the controller determines that the pressure and/or flow rate of product entering the inlet of the compression unit is below a predetermined level, a signal or instruction is sent to the valve actuator to open the valve and increase the flow of the supplemental fluid to the inlet of the compression unit. Conversely, where the pressure and/or flow rate of the product at the inlet of the compression unit is sensed to be at or above the predetermined level, the controller can instruct the valve actuator to constrict or close the valve. In this context, the predetermined level used by the controller to control the operation of the valve is a pressure and/or flow rate of the product that will prevent the formation of a vacuum in the line feeding the compression unit. Moreover, the sensed pressure and/or flow rate data acquired with this sensor can also be sued as an input for regulating the speed of the compressor motor as described herein.

An apparatus of the present invention includes a downstream unit that can include a purification unit for receiving at least a portion of the compressed product and producing a hydrogen-enriched product. Technologies for removing impurities from and/or concentrating hydrogen within a product gas stream are well known in the art and can include, methanation, selective oxidation, membrane separation techniques, temperature swing adsorption and pressure swing adsorption processes. By way of example, a number of purification processes separate hydrogen from impurities through selective adsorption by passing the hydrogen-containing stream under pressure through a column or bed of adsorbent material and/or through a hydrogen selective membrane. Selective adsorption can be performed with adsorptive materials that adsorb hydrogen and allow a hydrogen-depleted stream to pass, or with materials that adsorb impurity and allow a hydrogen-enriched stream to pass. In either case, is it highly preferred that the adsorbent materials be capable of regeneration, through one or more of such techniques as pressure swing, temperature swing and the like. In an embodiment of the present invention, purification can be carried out utilizing adsorptive materials that selectively adsorb impurities from a flow of product and allow a hydrogen-enriched product to pass.

The purification unit comprises a plurality of adsorbent beds, each of which is capable of removing one or more impurities from a product flowing through the bed. An adsorbent bed can include a vessel for housing adsorbent material(s). The adsorbent materials can take a variety of forms including packed beds of agglomerates, pellets, particles, and/or beads, monolithic structures, as well as various supports coated with adsorbent materials, e.g., coated sheets. In some embodiments, the adsorbent materials are provided as a packed bed having multiple layers of different adsorbent materials and/or mixtures of different adsorbent materials. In other embodiments, the adsorbent bed comprises a coated monolith or other structure configured to provide fluid pathways through the bed. Adsorbent materials suitable for use in the plurality of beds of the purification unit will depend on the materials to be adsorbed and removed from the process stream. By way of example, adsorbent materials known for use in removing water vapor, carbon dioxide and hydrocarbons can include alumina gels, activated carbon, silica gels and zeolites Moreover, zeolites such as low silica X zeolite and calcium or strontium exchanged chabazite are known for removing carbon monoxide and nitrogen.

The terminology "adsorption period" is used herein to refer to the period or the length of time that a flow of compressed product is directed through an adsorbent bed for purposes of removing impurity. At the conclusion of an adsorption period, the flow of product through a first adsorbent bed is interrupted and the flow is re-directed to a second adsorbent bed so as to continue the removal of impurity and the production of hydrogen-enriched product while enabling the first adsorbent bed to be regenerated. It is envisioned that two or more adsorption beds will be operated in an adsorption phase while the other adsorption beds are undergoing various stages of regeneration. Moreover, suitable purification units will include those that are capable of adjusting and manipulating the adsorption period so as to compensate for fluctuations in the pressure and/or flow rate of a product that is fed to the unit. The manner in which the adsorption period can be adjusted for purposes of achieving a hydrogen-enriched product of desired purity is described in additional detail below.

In some embodiments, the purification unit comprises a pressure swing adsorption ("PSA") unit. Suitable PSA units include those known in the art for separating hydrogen from a process stream, such as are described in U.S. Pat. No. 4,238,204 issued Dec. 9, 1980 to Perry; U.S. Pat. No. 4,690,695 issued Sep. 1, 1987 to Doshi; U.S. Pat. No. 5,256,174 issued Oct. 26, 1993 to Kai et al.; U.S. Pat. No. 5,435,836 issued Jul. 25, 1995 to Anand et al.; U.S. Pat. No. 5,669,960 issued Sep. 23, 1997 to Couche; U.S. Pat. No. 5,753,010 issued May 19, 1998 to Sircar et al.; and U.S. Pat. No. 6,471,744 issued Oct. 29, 2002 to Hill, the descriptions of which are incorporated herein by reference. In some embodiments, the purification unit will comprise a compact PSA. Suitable compact PSAs can include a rotary-type PSA such as are described in U.S. Pat. No. 6,063,161 issued May 16, 2000 to Keefer et al. and in U.S. Pat. No. 6,406,523 issued Jun. 18, 2002 to Connor et al., the descriptions of which are incorporated herein by reference. Compact PSAs having rotary elements are commercially available from Questair Technologies, Inc. of Burnaby, Canada. Questair's rotary-type PSA, model series number H3200, were used in the development of the present invention.

The purification unit can include a valve assembly that is capable of selectively controlling the flow of product to one or more of the plurality of adsorbent beds at least in part in response to the sensed product data described below. The valve assembly can comprise single or multiple valves having fixed or variable openings that are opened and closed to control material flows to the adsorbent beds. The valve assembly is capable of providing selective control over the flow of product to the adsorbent beds by controlling which adsorbent bed(s) receive a flow of product and by controlling the sequence in which different materials are directed through an adsorbent bed. As such, the configuration of the valve assembly provides control over both the adsorption and regeneration phases of each adsorbent bed. Depending on the nature of the adsorbent materials within the beds, control over regeneration can comprise imposing pressure and/or temperature swings, directing various materials through the bed and the like.

In an embodiment where the purification unit comprises a rotary-type PSA, the valve assembly preferably comprises a distribution valve wherein rotation is created between the distribution valve and the plurality of adsorbent beds to cycle the plurality of beds through adsorption-regeneration cycle(s). Such distribution valves are described in U.S. Pat. No. 4,925,464 issued May 15, 1990 to Rabenau et al.; U.S. Pat. No. 5,593,478 issued Jan. 14, 1997 to Hill et al.; U.S. Pat. No. 5,807,423 issued Sep. 15, 1998 to Lemcoff et al.; U.S. Pat. No. 6,056,804 issued May 2, 2000 to Keefer et al.; U.S. Pat. No. 6,372,026 B1 issued Apr. 16, 2002 to Takemasa et al.; U.S. Pat. No. 6,451,095 issued Sep. 17, 2002 to Keefer et al.; and U.S. Pat. No. 6,712,087 issued Mar. 30, 2004 to Hill et al., the descriptions of which are incorporated by reference. Rotation between the valve assembly and the adsorbent beds is preferably created by a variable-speed motor. Whereas the valve assembly controls the sequence of operations for each phase of the plurality of beds, the variable speed motor controls the length of each of those operations and the frequency at which the operations change. For instance, by adjusting the speed of such a motor, the adsorption period for the plurality of beds can be increased or decreased. Moreover, changes in the speed of rotation alter the frequency at which the flow of product is switched from a first adsorbent bed to a second adsorbent bed.

An apparatus of the present invention can optionally include a product sensor disposed downstream from the purification unit that is capable of sensing the hydrogen-enriched product and/or a hydrogen-depleted product and generating sensed product data therefrom. The sensed product data generated by the product sensor is relayed or communicated to the purification unit. The valve assembly within the purification unit controls the flow of product to the plurality of adsorbent beds in response to the sensed product data. Preferably, the product sensor is disposed downstream and proximate to an outlet of the purification unit so that changes in the product or exhaust composition are detected quickly and compensating action can be taken. Where an optional storage unit is disposed downstream of the purification unit for receiving and storing a hydrogen-enriched product, the product sensor is disposed upstream from the storage unit so that off-specification product can be detected and diverted.

Sensed product data can comprise temperature, pressure, density, flow rate and/or compositional data. The product sensor preferably comprises a gas sensor. The type of sensor selected is determined by the nature of the data that is to be used to control of the flow of product. Suitable sensors can include those capable of sensing and relaying temperature, pressure, density, flow rate, and/or compositional data. In some embodiments, the product sensor can comprise a compositional-type sensor for determining the concentration of a component within the hydrogen-enriched product and/or a hydrogen-depleted product. For instance, suitable sensors for detecting the presence or concentration of carbon monoxide, carbon dioxide, hydrocarbons, water, sulfur-containing compounds, and nitrogen-containing compounds are commercially available. In an embodiment where the product sensor comprises a sensor for sensing compositional data, the sensor is preferably not suitable for sensing the concentration of free oxygen in the hydrogen-enriched product and/or a hydrogen-depleted product.

In an embodiment where data relating to the concentration of hydrogen in the hydrogen-enriched product is needed, the sensor can comprise a sensor capable of sensing the hydrogen concentration, or more preferably, one or more sensors capable of sensing data from which the hydrogen concentration may be determined. A description of a method and apparatus for indirectly determining the hydrogen concentration of a reformate stream being fed to a fuel cell can be found in U.S. Pat. No. 6,770,391 B2 issued Aug. 3, 2004 to Nelson et al., the disclosure of which is incorporated herein by reference. The concentration of hydrogen in the hydrogen-enriched product exiting the purification unit should be greater than about 99.96%, preferably greater than about 99.97%, and more preferably greater than about 99.98% by vol. When the sensed product data relayed to the purification unit indicates that the concentration of hydrogen is decreasing, the purification unit can increase the frequency at which the flow of product is directed from one adsorbent bed to the next. More specifically, where the purification unit is a rotary-type PSA unit having a variable-speed motor, the speed of the variable-speed motor can be increased to shorten the adsorption period. Similarly, where the sensed product data indicates that the pressure and/or flow-rate of the hydrogen-enriched product is increasing, the speed of the variable-speed motor can be increased to shorten the adsorption period and maintain a desired concentration of hydrogen in the hydrogen-enriched product.

As noted above, an apparatus of the present invention can optionally include a controller for monitoring and controlling the operation of one or more of the components of the apparatus. Specifically, where the apparatus includes a sensor for sensing the pressure and/or flow rate of the product flowing to the compression unit, the controller can be capable of controlling the means for regulating the speed of the compressor motor in response to sensed pressure and/or flow rate. Where such an embodiment also includes a conduit for providing a controlled flow of supplemental fluid to an inlet of the compression unit, the controller can be capable of controlling the flow of supplemental fluid through the conduit in response to sensed pressure and/or flow rate.

In some embodiments, the controller can also include means for correlating the adsorption period of the purification unit at a given pressure with the composition and flow of hydrogen-enriched product that is to be produced. Such means can include a process model of the purification unit that is capable of determining the operational settings of the purification unit, e.g., the adsorption period or other cycle times, at various pressures for producing a given hydrogen-enriched product. In an alternative, such means can include a set of correlated data stored, preferably in table form, for access by the controller. Regardless of the means used, the means will provide the controller with instructions for setting or adjusting the operation of the purification unit at various pressures to produce a hydrogen-enriched product having a selected composition and flow rate. In an embodiment where the purification unit is a rotary-type PSA having a variable speed motor, the means for correlating can include a look-up table wherein hydrogen-enriched product compositions and flow rates at various pressures are correlated with various motor speeds that will produce the desired hydrogen-enriched product composition. Such a look-up table can also be used by the controller to adjust or implement changes in the speed of the variable speed motor based on sensed changes in the hydrogen-enriched product at a given pressure.

In some embodiments, the controller is implemented on a single computing system for controlling each facet of the operation of the apparatus that is not under manual control. In other embodiments, the controller can comprise multiple computing systems, each for controlling some designated facet of the operation of the apparatus. The controller can be rack-mounted or implemented as a desktop personal computer, a workstation, a notebook or laptop computer, an embedded processor, or the like. Indeed, this aspect of any given implementation is not material to the practice of the invention.

The computing system preferably includes a processor communicating with memory storage over a bus system. The memory storage can include a hard disk and/or random access memory ("RAM") and/or removable storage such as a floppy magnetic disk and/or an optical disk. The memory storage is encoded with a data structure for storing acquired data, an operating system, user interface software, and an application. The user interface software, in conjunction with a display, implements a user interface. The user interface can include peripheral I/O devices such as a key pad or keyboard, mouse, or joystick. The processor runs under the control of the operating system, which may be practically any operating system known to the art. The application is invoked by the operating system upon power up, reset, or both, depending on the implementation of the operating system.

Software implemented aspects of the invention are typically encoded on some form of program storage medium or implemented over some type of transmission medium. The transmission medium may be twisted wire pairs, coaxial cable, optical fiber, or some other suitable transmission medium known to the art. Some portions of the detailed descriptions herein are presented in terms of a software implemented process involving symbolic representations of operations on data bits within a memory in a computing system. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, data, elements, symbols, instructions, characters, terms, numbers, or the like. It should be borne in mind, however, that all of these and similar terms are to be associated with the appropriate physical quantities and are merely convenient labels applied to these quantities. Furthermore, the actions and processes of an electronic device that manipulates and transforms data represented as physical (electronic, magnetic, or optical) quantities within some electronic device's storage into other data similarly represented as physical quantities have been denoted by terms such as "processing," "computing," "calculating," "comparing," "determining," "displaying," and the like.

Where an apparatus of the present invention includes a purification unit, the apparatus can optionally include a product valve for use in controlling a flow of hydrogen-enriched product from a purification unit. In some embodiments, the product valve comprises a variable-opening valve. The product valve can be operated in part in response to sensed product data generated by a product sensor. Where the apparatus comprises a controller capable of receiving the sensed product data, the controller can be operate the product valve in response to the sensed product data. Preferably, the product valve is disposed downstream of the product sensor so that changes in the hydrogen-enriched product are detected quickly and compensating action can be taken to maintain the composition of the hydrogen-enriched product. In addition, where an optional storage unit, e.g., a tank, is disposed downstream of the purification unit for storing a hydrogen-enriched product, the product valve is disposed upstream from the tank so that off-specification product can be detected and diverted before it is received by the tank. Control over the flow of hydrogen-enriched product out of the purification unit can also be used to create back-pressure within the purification unit to maintain a more stable pressure within the purification unit. Moreover, such control can also provide additional control over the flow rate of product through the purification unit for purposes of maintaining the composition of the hydrogen-enriched product.

The downstream unit of an apparatus of the present invention can also include a storage unit for storing a hydrogen-enriched product and/or a second compression unit for producing a flow of compressed hydrogen-enriched product for storage depending on the pressure requirements of the particular storage unit selected. Moreover, a second conduit can be included that is capable of providing a controlled flow of compressed hydrogen-enriched product to the inlet of the second compression unit. The second conduit preferably has an inlet disposed intermediate the second compression unit and the storage unit, a valve for controlling the flow of compressed hydrogen-enriched product through the conduit, and an outlet disposed intermediate an outlet of the purification unit and the inlet to the second compression unit.

A storage unit suitable for use in an apparatus of the present invention can be selected from hydrogen storage devices that are known in the art. Preferably, the hydrogen storage device will comprise a storage vessel or tank suitable for containing the hydrogen-enriched product in a desired form, including but not limited to, pressurized gas, liquefied gas or solid. Suitable storage vessels can be portable, modular, skid mounted or fixed in place. Further, a selected storage unit preferably has sufficient storage capacity to enable the unit to deliver stored product to an outlet at a selected rate during periods in which the fuel processor is not operating and/or during periods of peak demand when the volume of product produced by the fuel processor must be supplemented to meet demand.

The hydrogen storage unit may comprise a high pressure vessel operably connected in fluid communication with a compression unit for storing a compressed product. Suitable storage units can also utilize hydrogen-fixing material(s) that can reversibly fix hydrogen. Hydrogen-fixing materials are known in the hydrogen storage art and can include activated carbon, carbon composites, fullerene-based materials, metal hydrides, alloys of titanium, vanadium, chromium and manganese, with or without additional elements, magnetic hydrogen-absorbing material, and nanostructures formed from light elements selected from the second and third rows of the periodic table. Examples of vessels containing hydrogen-fixing material for storing compressed hydrogen are described in U.S. Pat. No. 4,598,836 issued Jul. 8, 1986 to Wessel and U.S. Pat. No. 6,432,176 B1 issued Aug. 13, 2002 to Klos et al., the disclosures of which are incorporated herein by reference. In still other embodiments, the storage unit can comprise a liquefaction unit capable of converting the hydrogen-rich product to a liquefied product through cryogenic cooling or other liquefaction techniques.

An apparatus of the present invention can optionally include one or more sensors disposed throughout the apparatus for sensing the temperature, composition, density, pressure and/or flow rate of fluids at various locations within the apparatus. Those skilled in the art will appreciate that sensed data such as temperature and pressure can be used to calculate other fluid conditions such as product density using methods such as those described in U.S. Pat. No. 6,619,336 issued Sep. 16, 2003 to Cohen et al. In addition, sensed compositional information can be used for a variety of purposes including estimating the hydrogen concentration of the product as is described in U.S. Pat. No. 6,770,391 B2 issued Aug. 3, 2004 to Nelson et al. Sensors for sensing and monitoring the apparatus and fluid conditions of temperature, composition, pressure and flow rate are known and commercially available.

In a process aspect of the present invention, a method for producing hydrogen is provided. The method includes generating a product comprising hydrogen in a hydrogen generator. In a preferred embodiment, the hydrogen generator comprises a fuel processor. The product is compressed in a compression unit having an induction motor to produce a compressed product for delivery to a downstream unit. The speed of the motor is regulated in response to transient operations of hydrogen generator.

The speed of the induction motor is regulated in response to transient operations of the hydrogen generator by ramping up or down the power applied to the motor during such transient operations. Specifically, "transient operations" is intended to refer to start-up and shut-down sequences. However, it is also envisioned that ramping of the compressor motor may also be required during emergency shut down procedures and when the hydrogen generator is turndown or returned to hydrogen generation from a period of turndown. Failure to adjust the speed of the motor during such transients can result in the creation of a vacuum at the inlet of the compressor. The speed of the motor can be regulated by adjusting the line frequency of the power to be applied to the motor using a variable frequency drive or by adjusting the RMS of the voltage applied during start-up and/or shut-down using a soft start device as described herein. More specifically, the speed of the motor can be regulated with a soft start device having a plurality of switches having an adjustable firing angle and an adjustable ramp timer. Thus, such methods can further include adjusting the firing angle to an angle between 0° and about 120° and preferably between 0° and about 75°. When present, the adjustable ramp timer can be adjusted to a have time period less than about 1 minute, preferably less than about 30 seconds, more preferably less than about 20 seconds and still more preferably less than about 10 seconds.

The product produced by the hydrogen generator can have fluctuations in composition, pressure and/or flow rate and the method can also include reducing these fluctuations. Such fluctuations can be reduced or dampened by buffering the product produced by the fuel processor. In an alternative, fluctuations of pressure and/or flow rate can be reduced by providing a controlled flow of a supplemental fluid to an inlet of the compression unit. Such a method can optionally include sensing the pressure and/or flow rate of the product prior to compressing the product and controlling the flow of supplemental fluid in response to the sensed pressure and/or flow rate. Moreover, the speed of the compressor motor can be regulated in response to the sensed pressure and/or flow rate rather than ramping the motor speed based on a selected time period. The product can be compressed in a fixed or variable speed compressor. When the method includes compressing the product in a compressor operated at a selected speed, the adsorption period is preferably set and adjusted independent of the speed of the compressor.

Impurity can be removed from the product in a purification unit to produce a hydrogen-enriched product. Preferably, impurity is removed from the product through selective adsorption, and thus, the method can include the step of directing a flow of product to one or more of a plurality of adsorption beds for an adsorption period to remove impurity from the product and produce a hydrogen-enriched product. When used, it is preferred that the purification unit have a plurality of adsorbent beds so that the flow of product through a first adsorbent bed can be interrupted and re-directed through a second adsorbent bed to continue the removal of impurity and the production of hydrogen-enriched product. Further, the interruption of the flow of product through the first adsorbent bed and its re-direction enables the first adsorbent bed to be regenerated. Regeneration can include one or more of depressurizing, purging, heating, cooling and re-pressurizing the bed and the adsorbent materials therein. Regeneration of an adsorbent bed favors the release of adsorbed impurities to produce a flow of exhaust or a hydrogen-depleted product that comprises the previously adsorbed impurities. Therefore, a method of the present invention can optionally include regenerating at least one of a plurality of adsorbent beds to produce a hydrogen-depleted product while the flow of product is directed to one or more of the other beds.

In an embodiment where the purification unit comprises a PSA, the efficacy of removing impurity from a flow of product in a PSA unit depends on the design and materials of the PSA, the flow rate and composition of the product as well as the pressure within the PSA. The design and materials of a suitable PSA are detailed above. Typically, the flow of product from a fuel processor to the adsorbent beds of a PSA unit is between about 150 slpm and about 370 slpm, where standard units represent 25° C. at 1 atm pressure. The composition of the product can vary but will typically include $CO<1\%$, $CH_4<2\%$, $CO_2>15\%$ and $H_2>40\%$. The pressure within the PSA unit should be between about 70 psig and about 350 psig, but is preferably less than about 200 psig. Moreover, the pressure within the PSA is preferably fixed or stable while the PSA unit is removing impurity from the product. When the PSA unit is properly adjusted, a hydrogen-enriched product having a hydrogen concentration of at least about 99.90% by vol., can be produced at a rate of between about 40 slpm and about 120 slpm.

The hydrogen-enriched product or a hydrogen-depleted product can optionally be sensed to generate sensed product data. The hydrogen-enriched product or hydrogen-depleted product is sensed downstream proximate to the purification unit so that sensed data indicative of changes in the hydrogen-enriched product composition is detected and compensatory action can be taken quickly. The sensed product data can include temperature, pressure, density, flow rate, and/or compositional data.

The adsorption period can be adjusted in response to the sensed product data. Where the purification unit includes a pressure swing adsorption unit comprising a plurality of adsorbent beds, a valve assembly and a variable speed motor capable of creating rotation between the plurality of adsorbent beds and the valve assembly, the adsorption period can be adjusted by adjusting the speed of the variable speed motor. The speed of the motor for producing a hydrogen product having the desired purity and flow rate is design specific. In the case of a Questair H3200 series model PSA, the speed of the variable speed motor is preferably selected and adjusted within a range between about 3 to about 11 rpm to achieve the composition and flow rates noted above. A process model of the purification unit or correlated data in a look-up table can be used to adjust the adsorption period and thereby the operation of the purification unit. By way of example, where the concentration of hydrogen in the hydrogen-enriched product is measured or determined to be decreasing, the speed of the variable speed motor can be increased to increase the frequency at which the flow of product is directed from one bed to the next. By increasing the frequency in this manner, the adsorption period during which the flow of product flows through one or more of the adsorption beds is shortened. In an optional but preferred embodiment, the adsorption period is adjusted independent of the speed of the compressor.

A method of the present invention can optionally include controlling the flow of hydrogen-enriched product out of the purification unit, at least in part, in response to sensed product data. The flow of hydrogen-enriched product out of the purification unit can be controlled by a variable-opening product valve. This valve can be controlled by receiving sensed product data directly from the product sensor or from an optional controller as described above.

A method of the present invention can optionally include storing the hydrogen-enriched product in a storage unit. Where the hydrogen-enriched product is to be stored in a storage unit that requires the product to be at an elevated pressure, the flow of hydrogen-enriched product from the purification unit can be compressed in a second compression unit not unlike the compression unit described above.

DETAILED DESCRIPTION OF THE FIGURES

Figure 1:
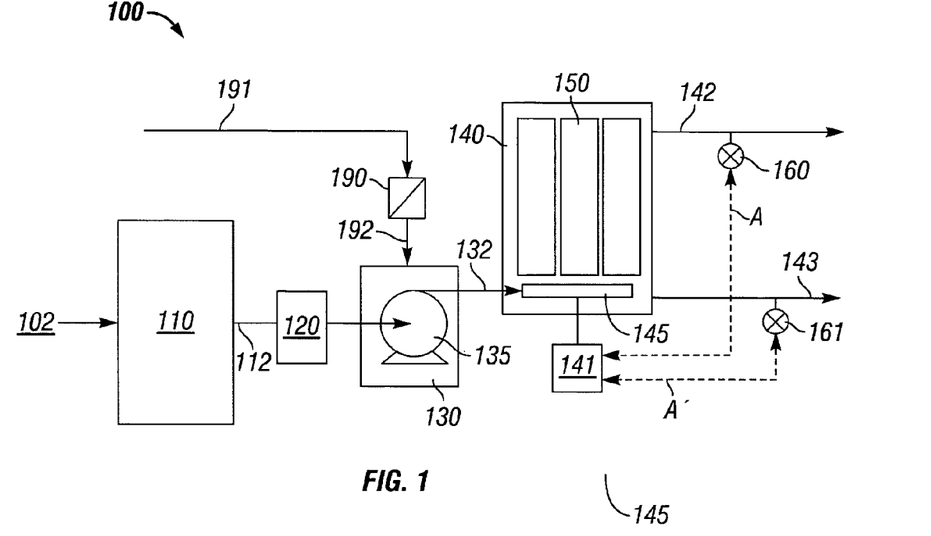
FIG. 1 is a schematic illustration of an embodiment of the present invention comprising a hydrogen generator, compression unit and a purification unit.

As illustrated in FIG. 1, apparatus 100 includes hydrogen generator 110 with feed 102. The nature of the hydrogen generator will control the number and nature of the feeds. For instance, where hydrogen generator 110 includes an electrolyzer, feed 102 will need to include connections with a source of water, a source of power and appropriate conductors for delivering the same to the electrolyzer. Where hydrogen generator 110 includes a fuel processor having an oxidizer and a reformer, feed 102 will include conduits for delivering reactants such as fuel, oxidant, and optionally water or steam, depending on the nature of the fuel processing reaction(s) to be performed. Regardless of the nature of hydrogen generator 110, the feeds are converted to a product that includes hydrogen and one or more impurities. The product produced by hydrogen generator 110 can have fluctuations in pressure, flow rate and/or composition, both during transient and steady state operations.

The flow of product is directed from hydrogen generator 110 to compression unit 130 via line 112. Means 120 are provided intermediate the compression unit and the hydrogen generator for reducing the fluctuations in the pressure and/or flow rate of the product. As illustrated, means 120 is a buffer having sufficient capacity to enable it to receive a variable flow of product and provide a flow of product to the compression unit that has more uniform pressure, flow rate and composition. Compression unit 130 has compressor motor 135, an induction motor, for driving the compression unit and producing a flow of compressed product for delivery to purification unit 140 via line 132. The compression unit further has variable frequency drive 190 for adjusting the line frequency to regulate the speed of the compressor motor. Variable frequency drive 190 receives line voltage 191 from a source (not shown), adjusts the frequency of the voltage and directs the adjusted frequency voltage to the compression unit via line 192.

Purification unit 140 uses selective adsorption to remove impurities from the product by directing the compressed product through a bed of adsorbent material(s) that preferentially adsorb impurities and allow a product rich in hydrogen to flow out of the bed. As illustrated in FIG. 1, purification unit 140 is a pressure swing adsorption unit having a plurality of adsorption beds 150 and valve assembly 145. Material flows to each of the plurality of adsorption beds 150 are controlled by valve assembly 145. The purification unit further comprises a variable speed motor 141 for creating rotation between valve assembly 145 and adsorbent beds 150. The configuration of valve assembly 145 and the speed of variable speed motor 141 determine the operational phase of an adsorbent bed and the rate at which the bed progresses through a cycle of adsorption and regeneration. During such a cycle, an adsorption bed can receive a flow of product, a flow of purge gas, can be depressurized, evacuated, heated, cooled and/or re-pressurized among other possible operations. It should be noted that sources and sinks for pressurization, purge gases and the like, as well as details concerning valve assembly 145 have not been illustrated in FIG. 1 so as not to obscure the invention.

During start-up, when the compressor motor 135 is first energized to begin compression of product, the variable frequency drive 190 adjusts the line frequency applied to the compressor motor to regulate the start-up speed of the motor. The speed of the compressor motor is thus regulated so that the motor can be ramped up over a short period of time to full power. Similarly, during shut-down and other transients, the variable frequency drive can be used to regulate the speed of compressor motor 135 by adjusting the line frequency.

Compressed product is directed into purification unit 140 where it is directed through one or more of adsorbent beds 150 for an adsorption period. The length of the adsorption period is determined by the configuration of the valve assembly 145 and the speed of motor 141. During the adsorption period, impurities within the flow of product are removed within the adsorbent bed(s) to produce a flow of hydrogen-enriched product that is directed out of the purification unit through line 142. As noted herein, the purity of the hydrogen-enriched product can depend on a number of factors including the type of adsorbent material, the configuration and geometries of the bed, the composition and flow rate of product, as well as the pressure and temperature conditions. For a given bed and adsorbent material, the length of the adsorption period will have a direct bearing on the purity of the hydrogen-enriched product and can be adjusted to manipulate the composition of the hydrogen-enriched product or to compensate for fluctuations in pressure and/or flow rate of the product produced by hydrogen generator 110.

Product sensor 160 is disposed downstream of purification unit 140 for sensing the hydrogen-enriched product flowing through line 142 and generating sensed product data. The sensed product data can include compositional information concerning the hydrogen-enriched product. As indicated by broken line A, the sensed product data is relayed or communicated to the variable speed motor 141, which is operated, at least in part, in response to the sensed product data. By adjusting the speed of motor 141 in response to sensed changes in the hydrogen-enriched product composition, the adsorption period can be adjusted to compensate for changes in product composition, flow rate, pressure and other factors that could negatively impact the purity of the hydrogen-enriched product. Further, such sensed data can be used to divert off-spec hydrogen-enriched product out of line 142 before it is delivered to storage or an end-user.

When one or more of the adsorbent beds 150 is regenerated, a hydrogen-depleted product is produced. As illustrated in FIG. 1, the hydrogen-depleted product is directed out of the purification unit through line 143. Line 143 is provided with a product sensor 161 for sensing the hydrogen-depleted product flowing through line 143. As indicated by broken line A', the sensed product data is relayed or communicated to the variable speed motor 141, which is operated, at least in part, in response to the sensed product data.

Figure 2:
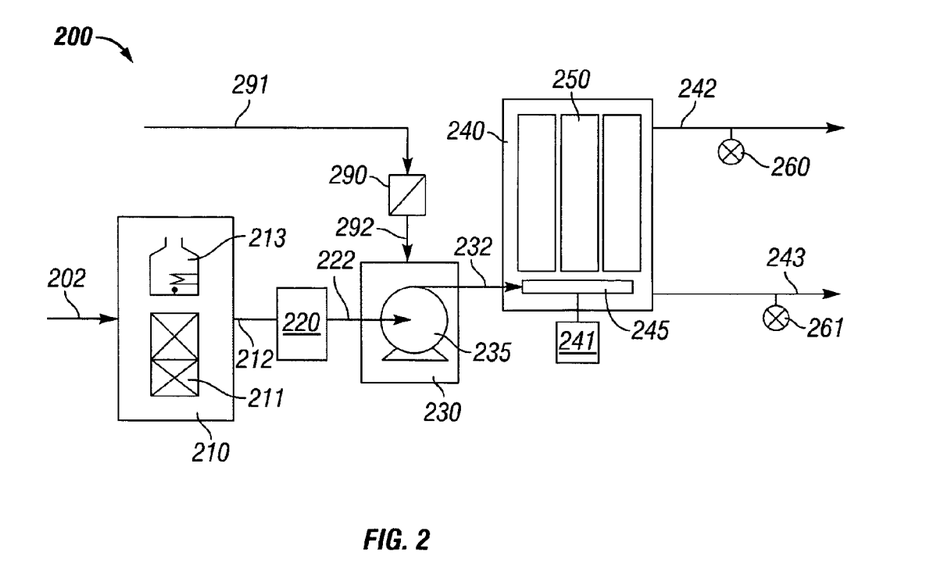
FIG. 2 is a schematic illustration of an embodiment of the present invention comprising a fuel processor, a compression unit and a purification unit.

FIG. 2 illustrates an embodiment 200 of the present invention wherein the apparatus comprises fuel processor 210 having oxidizer 213 and reformer 211. Feed 202 delivers a fuel, oxidant and water for reforming in the fuel processor 210. The product produced in fuel processor 210 is directed to buffer 220 via line 212, and then to compression unit 230 via line 222. The flow of product is compressed within compression unit 230 having compressor motor 235, an induction motor, prior to being directed to purification unit 240. Compression unit 230 has soft start device 290 for adjusting the RMS of the voltage 291 delivered to the compression motor 235 for regulating the speed of the motor, particularly during start-up and shut-down. A detailed description of start device 290 is provided below in association with FIG. 5A.

Purification unit 240 is not unlike the purification unit illustrated in FIG. 1, having a plurality of adsorbent beds 250, a valve assembly 245 and a variable speed motor 241 for creating rotation between the adsorbent beds and the valve assembly. Product sensor 260 is positioned downstream of the purification unit for sensing the hydrogen-enriched product flowing out of the purification unit through line 242. Product sensor 261 is positioned downstream of the purification unit for sensing the hydrogen-depleted product flowing out of the purification unit through line 243. The sensed product data is relayed to a controller (not shown), which determines if the speed of variable speed motor 241 requires adjustment, and where needed, determines the adjustment and communicates an appropriate instruction to motor 241.

Figure 3:
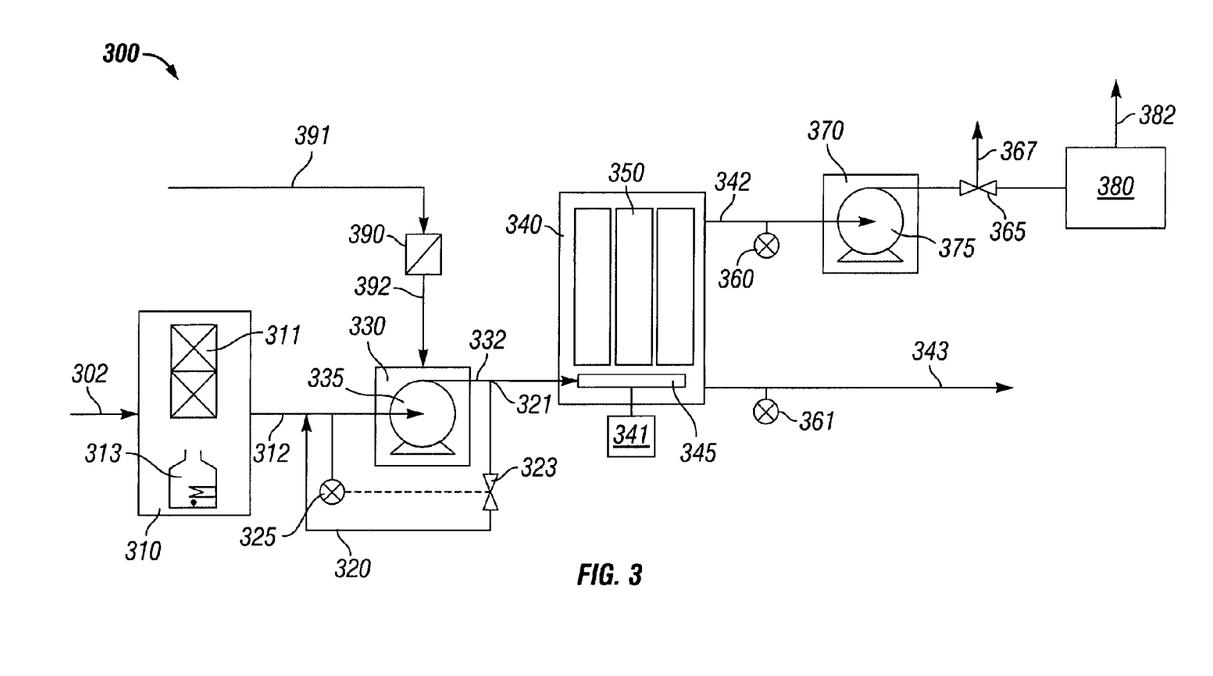
FIG. 3 is a schematic illustration of an embodiment of the present invention comprising a fuel processor, compression unit, purification unit, second compression unit and a storage unit.

The embodiment 300 illustrated in FIG. 3 has a fuel processor 310, a compression unit 330, a purification unit 340, second compression unit 370, and tank 380. As illustrated, feed 302 delivers a fuel, oxidant and water for reforming in the fuel processing unit 310. Fuel processor 310 includes an oxidizer 313 wherein fuel and oxidant are pre-heated and water is converted to steam. The fuel processor also includes a reforming reactor 311 wherein the pre-heated reactants are converted to a product comprising hydrogen and one or more impurities.

As noted herein, a flow of product from fuel processor 310 can have variations or fluctuations in composition, pressure and/or flow rate. To reduce such fluctuations, conduit 320 having inlet 321 and variable-opening valve 323 are provided for directing a controlled flow of compressed product to line 312. Sensor 325 is provided upstream of compression unit 330 for sensing the pressure and/or flow rate of product in line 312. Sensed pressure and/or flow rate data from sensor 325 can be relayed directly to variable-opening valve 323 for use in controlling the position of the valve, as indicated by broken line E. In the alternative, data generated by sensor 325 can be relayed to a controller (not shown) for use in operating valve 323. A flow of compressed product to line 312 via conduit 320 serves to dampen fluctuations in the pressure and/or flow rate of the product delivered to the compression unit and inhibits the formation of a vacuum within line 312 that might otherwise draw and mix atmospheric gases with the product.

The product produced in fuel processor 310 is directed to compression unit 320 via line 312. The compression unit receives the product and produces a flow of compressed product that is directed to purification unit 330 through line 332. Compression unit 330 has compressor motor 335, an induction motor, and soft start device 390. Soft start device 390 adjusts the RMS of the voltage 391 delivered to the compression motor 335 for regulating the speed of the motor, particularly during start-up and shut-down. Sensed pressure and/or flow rate data from sensor 325 can be relayed to sot start device 390 for use in controlling the speed of compressor motor 335.

Purification unit 330 has a plurality of adsorbent beds 350, a valve assembly 345 and a variable speed motor 341 for creating rotation between the adsorbent beds and the valve assembly. The operation of purification unit 330 is similar to the operation of the purification units illustrated in FIG. 1 and FIG. 2. Product sensor 360 is positioned downstream of the purification unit for sensing the hydrogen-enriched product flowing out of the purification unit through line 342. Product sensor 361 is positioned downstream of the purification unit for sensing the hydrogen-depleted product flowing out of the purification unit through line 343. The sensed product data is relayed to a controller (not shown) from product sensors 360 and 361. Based at least in part on the sensed product data, the controller determines if the speed of variable speed motor 341 requires adjustment, and when needed, determines the adjustment and communicates an appropriate instruction to motor 341.

Product valve 365 is provided downstream of product sensor 360 for diverting off-specification product so that it is not directed to storage unit 380. Second compression unit 370 is disposed intermediate the purification unit and the storage unit for receiving a hydrogen-enriched product from the purification unit and producing a compressed hydrogen-enriched product for storage in tank 380.

FIG. 4 is block diagram illustrating various process steps in a fuel processing operation. The steps illustrated in FIG. 4 were described in detail above and are not repeated here.

Figure 5A:
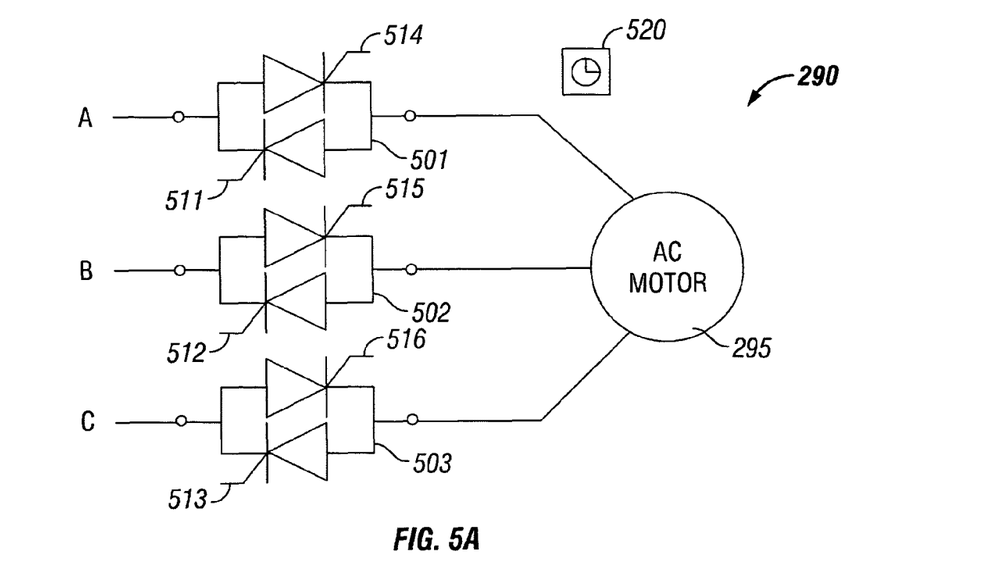
FIG. 5A is a schematic illustration of means for regulating the speed of the motor.

FIG. 5A is a schematic showing soft start device 290 and compressor motor 235 of FIG. 2. As shown, soft start device includes a plurality of switches 501-503 having an adjustable firing angle 511-516. In addition, adjustable ramp timer 520 is provided for controlling the time period of the ramp-up or ramp-down of compressor motor 295. Reference letters A, B and C represent the three phases of the line voltage 291 directed to switched 501-503 respectively.

Figure 5B:
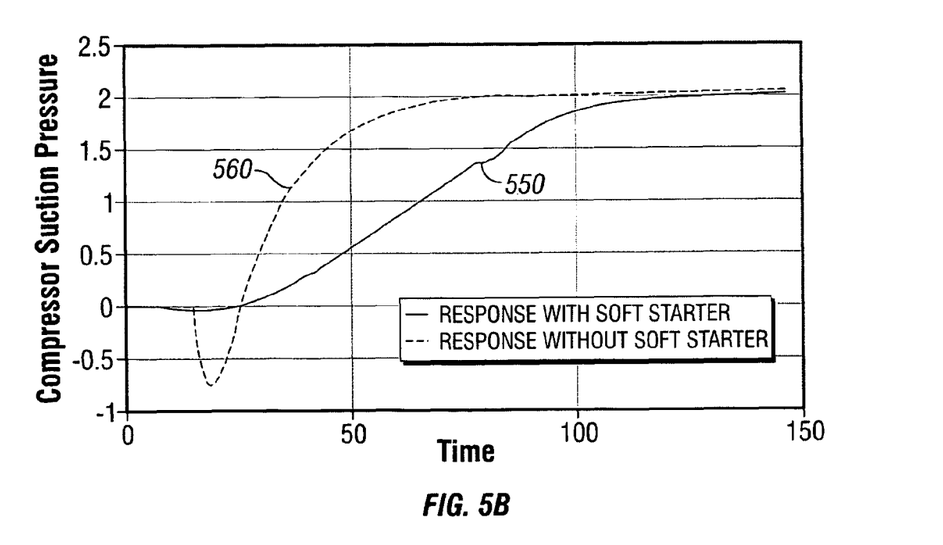
FIG. 5B is a graph illustrating start-up compressor pressure data for an apparatus of the present invention.

FIG. 5B is a graphical illustration of compressor suction pressures obtained from a simulated start-up of the compressor motor as a function of time. The pressures at the inlet of the compressor were determined in the first instance while regulating the speed of the compressor motor using a soft start device, and secondly, without regulation of the speed compressor motor. The simulated pressures observed while regulating the speed of the compressor motor are referenced by line 550, while those observed without regulating the speed of the compressor are referenced by line 560. As shown, when the speed of the compressor motor was regulated by the soft start device, negative pressures at the inlet of the compressor were avoided. When the speed of the compressor was not regulated during start-up, negative pressures approaching −0.80 units were observed until a sufficient flow of product was established.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for producing hydrogen, the method comprising:

generating a product comprising hydrogen in a hydrogen generator;

compressing the product in a compression unit having an induction motor to produce a compressed product; and regulating the speed of the motor in response to transient operations of the hydrogen generator.

2. The method of claim 1, wherein the hydrogen generator comprises a fuel processor.

3. The method of claim 1, wherein the speed of the motor is regulated by adjusting the line frequency applied to the induction motor.

4. The method of claim 3, wherein the line frequency applied to the motor is adjusted by a variable frequency drive.

5. The method of claim 1, wherein the speed of the motor is regulated by adjusting the RMS of the voltage applied to the induction motor.

6. The method of claim 5, wherein the RMS of the voltage applied to the induction motor is adjusted by a soft start device comprising a plurality of switches and an adjustable ramp timer, the plurality of switches having an adjustable firing angle.

7. The method of claim 6, further comprising adjusting the firing angle of the plurality of switches to an angle between 0° and about 75°.

8. The method of claim 6, further comprising adjusting the ramp timer to have a time period from about 0 to about 20 seconds.

9. The method of claim 1, wherein the transient operations of the hydrogen generator comprise one or more of start-up, shut-down, turn-down and turn-up.

\* \* \* \* \*